US010943167B1

(12) United States Patent
Amirineni et al.

(10) Patent No.: US 10,943,167 B1
(45) Date of Patent: *Mar. 9, 2021

(54) RESTRUCTURING A MULTI-DIMENSIONAL ARRAY

(71) Applicant: Amazon Technologies, Inc., Seattle, WA (US)

(72) Inventors: Sundeep Amirineni, Austin, TX (US); Ron Diamant, Albany, CA (US); Randy Huang, Morgan Hill, CA (US); Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,698

(22) Filed: Aug. 12, 2019

Related U.S. Application Data

(63) Continuation of application No. 15/908,236, filed on Feb. 28, 2018, now Pat. No. 10,445,638.

(51) Int. Cl.
*G06N 3/04* (2006.01)
*G06F 17/16* (2006.01)
*G06F 17/11* (2006.01)
*G06N 5/04* (2006.01)

(52) U.S. Cl.
CPC ............ *G06N 3/04* (2013.01); *G06F 17/11* (2013.01); *G06F 17/16* (2013.01); *G06N 5/046* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 5,402,369 | A | 3/1995 | Main |
| 6,654,730 | B1 | 11/2003 | Kato et al. |
| 9,836,691 | B1 * | 12/2017 | Narayanaswami ...... G06N 3/04 |
| 2004/0158543 | A1 | 8/2004 | Salam et al. |
| 2012/0136913 | A1 | 5/2012 | Duong et al. |
| 2018/0285254 | A1 * | 10/2018 | Baum ................. G06F 9/30054 |
| 2019/0303743 | A1 * | 10/2019 | Venkataramani ..... G06F 9/3834 |

OTHER PUBLICATIONS

U.S. Appl. No. 15/908,236 , "Restructuring a Multi-Dimensional Array", filed Feb. 28, 2018, 46 pages.
U.S. Appl. No. 15/908,236 , "Notice of Allowance", dated May 31, 2019, 9 pages.

* cited by examiner

*Primary Examiner* — Michael D. Yaary
(74) *Attorney, Agent, or Firm* — Kilpatrick Townsend & Stockton LLP

(57) ABSTRACT

Disclosed herein are techniques for performing neural network computations. In one embodiment, an apparatus includes an array of processing elements, the array having configurable dimensions. The apparatus further includes a controller configured to set the dimensions of the array of processing elements based on at least one of: a first number of input data sets to be received by the array, or a second number of output data sets to be output by the array.

20 Claims, 13 Drawing Sheets

RESTRUCTURING A MULTI-DIMENSIONAL ARRAY

CROSS REFERENCE TO RELATED APPLICATIONS

This application claims priority to and is a continuation of U.S. patent application Ser. No. 15/908,236 filed Feb. 28, 2018, issued as U.S. Pat. No. 10,445,638 on Oct. 15, 2019, and titled "RESTRUCTURING A MULTI-DIMENSIONAL ARRAY", the contents of which are herein incorporated in its entirety.

BACKGROUND

Artificial neural networks are computing systems with an architecture based on biological neural networks. Artificial neural networks can be trained, using training data, to learn about how to perform a certain computing task.

A neural network may include a set of processing nodes. Each processing node can process a piece of the input data to generate an output, and the final decision can be generated based on a combination of the outputs of the set of processing nodes. As part of the processing, each processing node can perform a set of arithmetic operations such as, for example, floating-point multiplications and additions, etc. A neural network may be implemented by circuitries and data paths, such as a systolic array, which comprises an array of data processing units capable of performing concurrent arithmetic operations. The utilization rate of a systolic array, as well as the speed of processing, may depend on how the systolic array is mapped to the inputs and outputs of the neural network layer.

BRIEF DESCRIPTION OF THE DRAWINGS

Various embodiments in accordance with the present disclosure will be described with reference to the drawings, in which.

DETAILED DESCRIPTION

Figure 1:
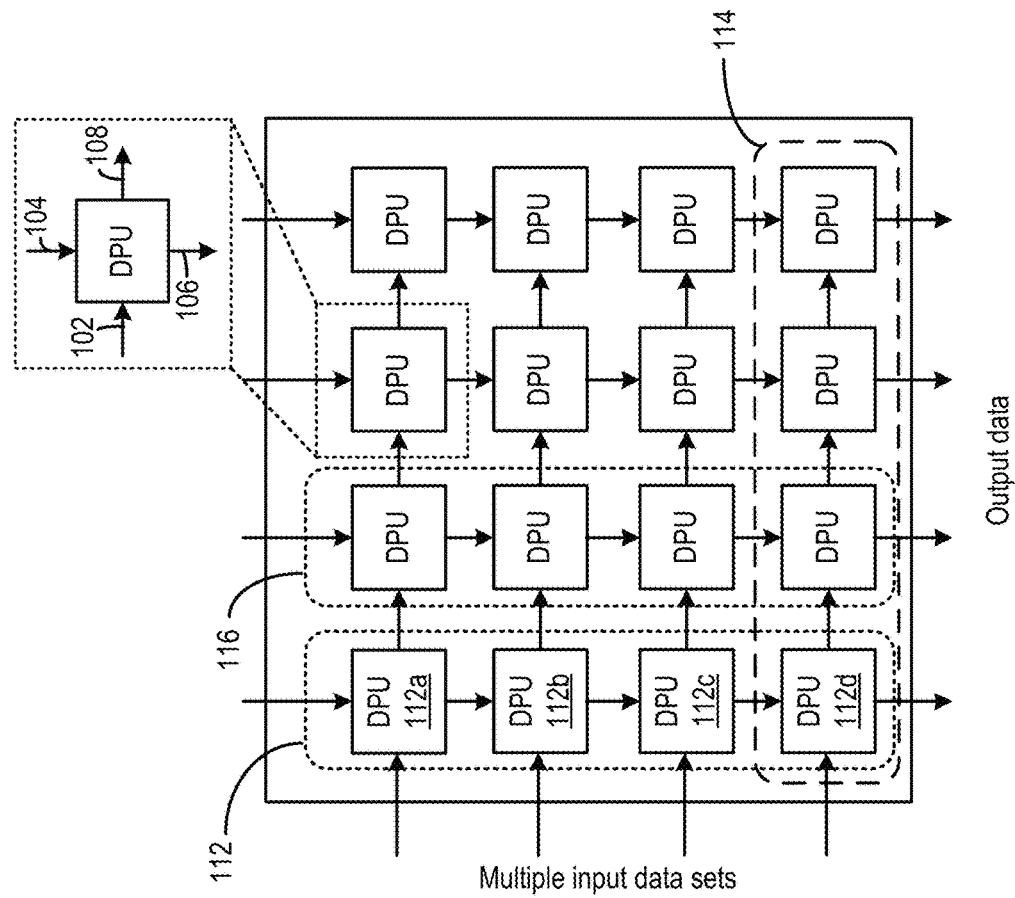
FIG. 1 illustrates an example of a systolic array.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

An artificial neural network (herein after "neural network") may include multiple processing nodes. The processing nodes can be divided into layers including, for example, an input layer, a number of intermediate layers (also known as hidden layers), and an output layer. Each processing node of the input layer receives an element of an input set, and scales the element with a weight to indicate the element's degree of influence on the output. The processing nodes in the intermediate layers may combine the scaled elements received from each processing node of the input layer to compute a set of intermediate outputs. For example, each processing node in the intermediate layers may compute a sum of the element-weight products, and then generate an intermediate output by applying an activation function to the sum. The intermediate outputs from each processing node of one intermediate layer may be considered as an activated vote (or no-vote), associated with a weight indicating the vote's influence, to determine the intermediate output of the next intermediate layer. The output layer may generate a sum of the scaled intermediate outputs from the final intermediate layer, and generate a binary output (e.g., "yes" or "no") based on whether the sum of the scaled intermediate outputs exceeds a threshold. Due to the combination of scaled elements between layers, the sizes of the higher layers (e.g., the output layer, the intermediate layers immediately before the output layer, etc.) typically are smaller than the sizes of the lower layers (e.g., the input layer, the intermediate layers immediately after the input layer, etc.).

Embodiments of the present disclosure relate to a computing system for performing neural-network processing of data. More specifically, the computing system may include an array of processing elements. Each processing element may include at least two (e.g., two, four, eight, etc.) arithmetic units, with each arithmetic unit capable of performing a multiplication and an addition. The array can be dynamically configured to expand or shrink the number of input data sets the array can process by having the at least two arithmetic units to process at least two different input data sets, or to process the same input data set. Moreover, the array can be dynamically configured to expand or shrink the number of outputs the array can generate by, for example, providing the outputs from each arithmetic unit as separate output data sets, or combining the outputs of the arithmetic unit into a single output data set. With the dynamic configuration, each processing element can represent one or more processing nodes in a neural network layer.

As discussed above, the processing nodes may be implemented by a systolic array, which comprises an array of data processing units capable of performing concurrent arithmetic operations including additions and multiplications. FIG. 1 illustrates an example of a systolic array 100, which includes an array of data processing units (DPU) connected in a network. The array of DPUs can be arranged into rows and columns. In the example of FIG. 1, systolic array 100 includes a 4×4 array, with four DPUs in each row and four DPUs in each column. Each DPU may include a row input bus 102, a column input bus 104, a column output bus 106, and a row output bus 108. A DPU may receive inputs from a left DPU of the same row (or from external circuitries) via row input bus 102. The DPU may also receive inputs from a DPU of the same column above (or from external circuitries) via column input bus 104. Each DPU may include a multiplier and an adder to perform multiplication and addition operations based on the inputs, and transmit the result of the multiplication and addition operations to a DPU of the same column below (or to external circuitries) via column output bus 106. The DPU may also forward the inputs received via row input bus 104 to a right DPU of the same row via row output bus 108.

Systolic array 100 can be configured to perform the arithmetic operations, including multiplications and additions, for a set of processing nodes of a neural network. In the example of FIG. 1, column 112 of the DPUs (the leftmost column) may receive four sets of input data, with each set of input data being handled by one row of the DPUs. Each DPU in column 112 may obtain, from the corresponding input data set received via row input bus 102, an input element and a weight associated with the input element. Each DPU in row 114 (the bottom row) may generate an output corresponding to a sum of scaled inputs and can represent the output of one processing node. For example, each DPU may generate, using the multiplier, a multiplication product between the input element and the weight. The multiplication products generated by the DPUs within any column (including column 112) can be accumulated by the adder of each DPU. For example, DPU 112a (of column 112) may generate a first multiplication product, and transmit the first multiplication product to DPU 112b via column output bus 106 as a partial sum. DPU 112b may also generate a second multiplication product, add the second multiplication product to the partial sum, and transmit the updated partial sum to DPU 112c via column output bus 106. The partial sums are updated and propagated across column 112, and DPU 112d may generate a sum of the multiplication products. Moreover, each DPU in column 112 can also propagate streams of input data sets to other DPU columns (e.g., column 116), so that other columns can generate sums representing the outputs of other processing nodes. Each column may receive inputs and weights at substantially the same time, and each column of DPUs can perform the arithmetic operations (multiplications and summations) to generate the outputs for other processing nodes in parallel. In the example of FIG. 1, with four columns of DPUs, the array can generate outputs for four processing nodes in parallel.

Although systolic array 100 can speed up neural network processing by allowing parallel arithmetic operations, the utilization rate of the systolic array may vary based on a size (e.g., a number of bits) of the input data and the processing capacity of arithmetic units. For example, in a case where the multiplier and the adder of the DPU of systolic array 100 are capable of processing 16-bit numbers, but the input data and the weights provided to the DPUs are 8-bit numbers, half of the arithmetic processing capacity of the DPU is not utilized, and the utilization rate of the systolic array may be at 50% or lower.

In another example, the utilization rate of systolic array 100 may be reduced due to a number of sets of input data to be processed exceeding the number of rows of the DPU. In such a case, not only the utilization rate is reduced, the processing time can also be increased. For example, instead of four sets of input data, systolic array 100 may be operated to process eight sets of input data, and to generate outputs corresponding to two processing nodes instead of four processing nodes. This may happen when, for example, systolic array 100 is switched from processing one neural network layer to processing another neural network layer with different number of inputs and outputs. The mismatch between the number of output data sets systolic array 100 can generate at any given time (four), and the number of output data sets systolic array 100 is configured to generate (two), leads to a reduction in the utilization rate of systolic array 100. For example, in this case only two columns of systolic array 100 are used to generate the outputs for the two processing nodes, leading to 50% utilization rate. Moreover, the mismatch between the number of input data sets systolic array 100 can process at any given time (four), and the number of input data sets systolic array 100 needs to process (eight), can also lead to increase in the processing time. For example, given that systolic array 100 can only accept four sets of input data at a time, systolic array 100 may be operated to generate the outputs in two separate cycles. In the first cycle, systolic array 100 may be operated to generate the sums for the first four sets of input data and store the sums in a buffer. In the next cycle, and systolic array 100 may be operated to feed the sums back to the top row of DPUs (e.g., DPU 102a) to generate the sums for the next four sets of input data. As a result, in addition to the utilization rate being reduced, the processing time also increases as well.

As another example, the utilization rate of systolic array 100 may be reduced due to a number of sets of output data to be processed exceeding the number of columns of the DPU. For example, systolic array 100 may be operated to receive two sets of input data, and to generate outputs corresponding to eight processing nodes instead of four processing nodes. The mismatch between the number of input data sets systolic array 100 can process at any given time (two), and the number of output data sets systolic array 100 is configured to process (two), also leads to a reduction in the utilization rate of systolic array 100. In this case, only two rows of systolic array 100 are used to generate the outputs for the two processing nodes, again leading to 50% utilization rate. Moreover, the mismatch between the number of output data sets systolic array 100 can generate at any given time (four), and the number of output data sets systolic array 100 needs to generate (eight), can also lead to increase in the processing time. For example, systolic array 100 may be operated to generate the outputs in two separate cycles, where the outputs of the first four processing nodes are generated in the first cycle and the outputs of the next four processing nodes are generated in the second cycle. Just as the first example, in addition to the utilization rate being reduced, the processing time also increases as well.

In these examples, precious computing resources may be wasted by idling a large portion of systolic array 100. Moreover, the increase in the processing time may also degrade the performance of a neural network application that relies on systolic array 100. Notice that the numerical values (e.g., 50% utilization rate) described above are provided as non-limiting examples only.

Embodiments of the present disclosure relate to a computing system for performing neural-network processing of data. More specifically, the computing system may include an array of processing elements. Each processing element may include at least two (e.g., two, four, eight, etc.) arithmetic units, with each arithmetic unit capable of performing a multiplication and an addition. The array can be dynamically configured to expand or shrink the number of input data sets the array can process by having the at least two arithmetic units to process at least two different input data sets, or to process the same input data set. Moreover, the array can be dynamically configured to expand or shrink the number of outputs the array can generate by, for example, providing the outputs from each arithmetic unit as separate output data sets, or combining the outputs of the arithmetic unit into a single output data set.

For example, to expand the number of input data sets processed by the array, each row of the array may receive two input data sets, each processing element of the row can perform two multiplications (between two inputs and two weights) to generate two multiplication products for each of the two input data sets, and perform two additions to generate two partial sums for each of the two input data sets. The two partial sums can be accumulated across each column of processing elements to generate two sums. The two sums can be added up to generate a single output data set. As a result, the effective number of rows of the array can be doubled.

As another example, to expand the number of output data sets (which can correspond to the number of processing nodes in a neural network), the two arithmetic units of each processing element can perform two multiplications and two additions to generate two partial sums for a single input data set. The two partial sums can also be accumulated across each column to generate two sums, and the two sums can be output as two processing nodes outputs. As a result, the effective number of columns of the array can be doubled as well.

Compared with aforementioned rigid structure of a systolic array 100, where each DPU includes a single adder and a single multiplier, embodiments of the present disclosure includes an array of processing elements that has multiple adders and multiple multipliers capable of processing inputs from a single input data set or inputs from multiple input data sets. Together with configurable processing of the outputs of each column (e.g., by either treating the outputs as separate output data sets or combining the outputs to form a single output data set), dynamic expansion (or shrinking) of a number of input data sets an array can handle, as well as dynamic expansion (or shrinking) of a number of output data the array can generate, can be achieved. As discussed above, as the computing system switches from processing of one neural network layer to another neural network layer, the number of input data sets and the number of outputs (which may correspond to a number of processing nodes) may change. By providing the capability of dynamically changing the numbers of effective rows and/or effective columns of the array, the reduction in low utilization rate and increase in response time due to the mismatches between the number of rows and the number of input data sets, and/or due to the mismatches between the number of columns and the number of output data sets, can be mitigated. As a result, both the utilization rate and the performance of the computing system can improve.

Figure 2:
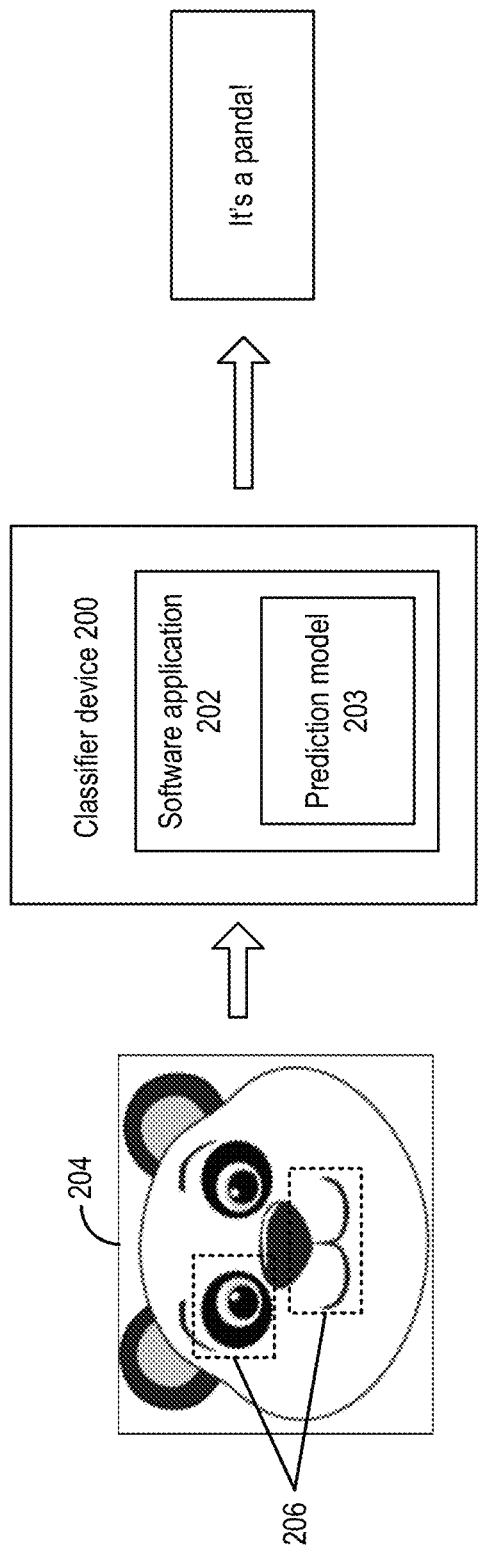
FIG. 2 illustrates an example classifier device that uses techniques disclosed herein to process data.

FIG. 2 illustrates an example classifier device 200 that uses techniques disclosed herein to process data. Classifier device 200 can be, for example, a computing device operating a software application 202 and a prediction model 203 to predict information included in a data sequence, and perform a pre-determined function based on the prediction. For example, classifier device 200 can be part of an image recognition service provided to identify certain objects (e.g., texts, a person, etc.) from an image. It is understood that the image recognition service is merely provided as an illustrative example, and that techniques disclosed herein can be used for other data processing applications including, for example, text-based data processing (e.g., processing of search queries), audio data processing, etc.

The image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most cases, instances, such as bare-metal or virtual machine instances, in a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 2, the multi-tenant compute service system may provide the image recognition service when the client needs it and decommissioned when it is no longer needed, such that the resources supporting the image recognition service (e.g., access to software application 202, and the underlying hardware resources for processing software application 202) can be reallocated to other clients.

As shown in FIG. 2, software application 202 can receive pixel data of an image 204 from a user. Image 204 may include an array of pixels. Software application 202 can perform analysis on the pixel data, and predict one or more objects 206 depicted in image 204. The analysis may include, for example, comparing the pixel data against a set of pre-determined features data. The pre-determined features data may include data associated with a set of pre-determined visual image features such as, for example, a nose object, a mouth object, etc. The pre-determined features data may also include data associated with non-visual image features, or a combination of visual and non-visual image features. As to be discussed in more detail below, software application 202 may employ prediction model 203 to compute a set of scores based on the pixel data of image 204. The set of scores may represent, for example, the likelihood of image 204 including the image features represented by the features data. Software application 202 can then determine other information about the content of image 204 based on the scores. For example, based on the scores, software application 202 can determine that image 204 is an image of a panda.

Figure 3A:
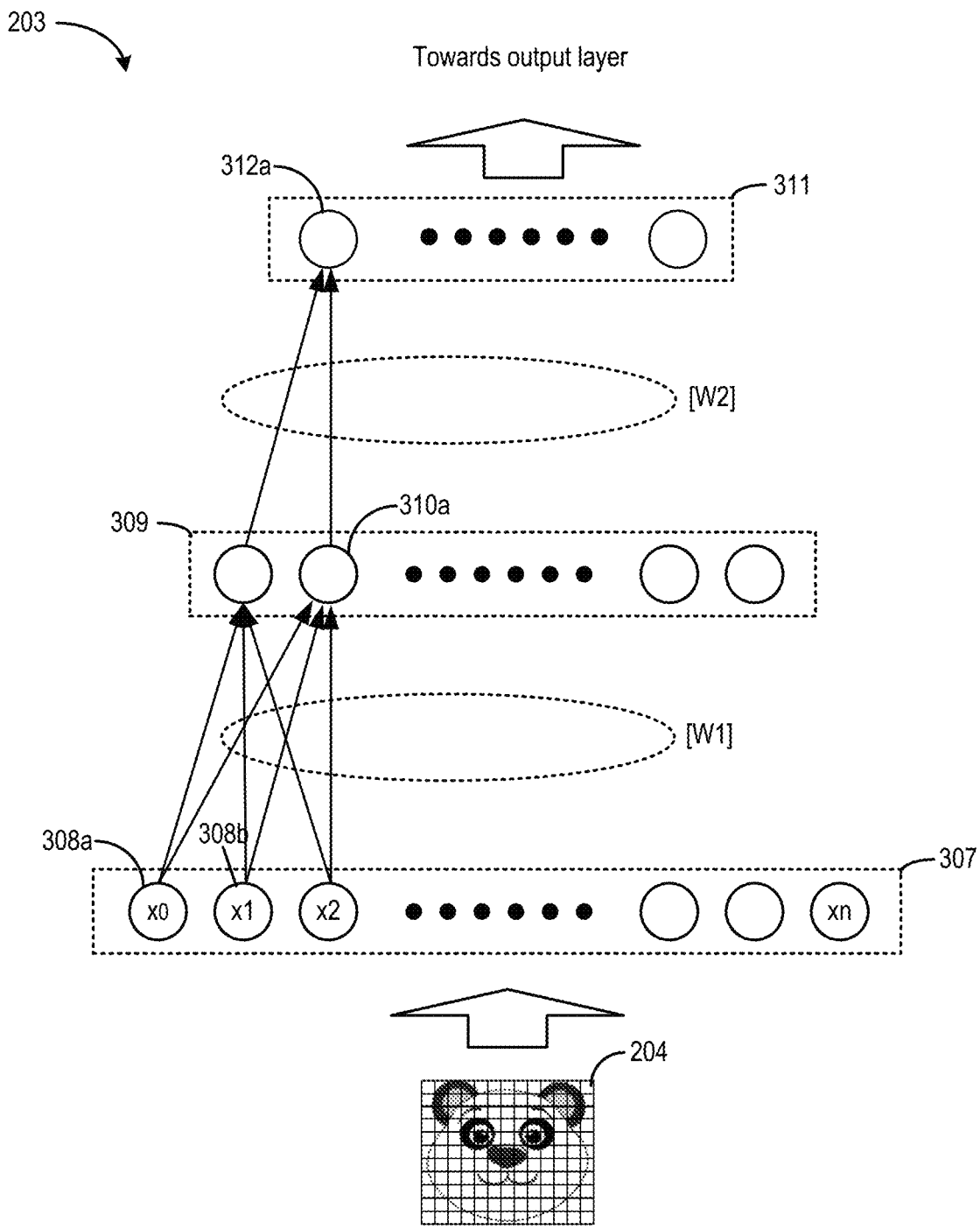
FIGS. 3A-3D are simplified block diagrams illustrating a prediction model and the computations that use techniques disclosed herein, according to certain aspects of the present disclosure.

Prediction model 203 can be in the form of an artificial neural network. The artificial neural network may include a plurality of processing nodes, with each processing node configured to process part of the input pixel data, or to further process the intermediate outputs from other processing nodes. FIG. 3A illustrates an example of prediction model 203 that uses techniques disclosed herein. In the example of FIG. 3A, prediction model 203 may be a multi-layer neural network such as a deep neural network (DNN), a convolutional neural network (CNN), etc. Prediction model 203 may include an input layer 307, a set of intermediate layers including intermediate layers 309 and 311, and an output layer (not shown in FIG. 3A).

Layer 307 may process pixel data representing different portions of image 204. For example, in the example of FIG. 3A, layer 307 may process the pixel data of image 204. Each processing node of layer 307 is assigned to receive a pixel value (e.g., $x_0$, $x_1$, $x_2$, . . . $x_n$) corresponding to a pre-determined pixel within image 204, and transmit one or more weights with the received pixel value to layer 309. In a case where prediction model 203 is a DNN, each processing node of layer 307 can be assigned a set of weights defined based on a matrix W1. Each processing node of layer 307 can send the received pixel value and the assigned weights to each processing node of layer 309. In a case where prediction model 203 is a CNN, groups of the processing nodes of layer 307 may share a set of weights, and each group may send the set of weights and the pixel values received by the group of processing nodes to a single processing node of layer 309.

Layer 309 may process the scaled outputs from layer 307 to generate a set of intermediate outputs. For example, assuming processing node 310a of layer 309 is connected to processing nodes in layer 307, processing node 310a may generate a sum of the scaled outputs received from layer 307 based on the following equation:

$$\text{sum}_{310a} = \Sigma_{i=0}^{n}(W1_i \times x_i) \quad \text{(Equation 1)}$$

Here, $\text{sum}_{310a}$ represents a sum generated by processing node 310a. $W1_i \times x_i$ represents a scaling of a particular pixel value (e.g., $x_0$) with the associated weight (e.g., $W1_0$) by a processing node of layer 307. In a case where prediction model 203 is a DNN, each processing node of layer 309 may generate the sum based on the scaling of pixel values from each processing node of layer 307, and then generate a sum (e.g., $\text{Sum}^{310a}$) by summing the scaled pixel values. The sum may also represent a dot-product between an input vector comprising a number of elements (e.g., pixel values) and a weight vector (e.g., W1).

Figure 3B:
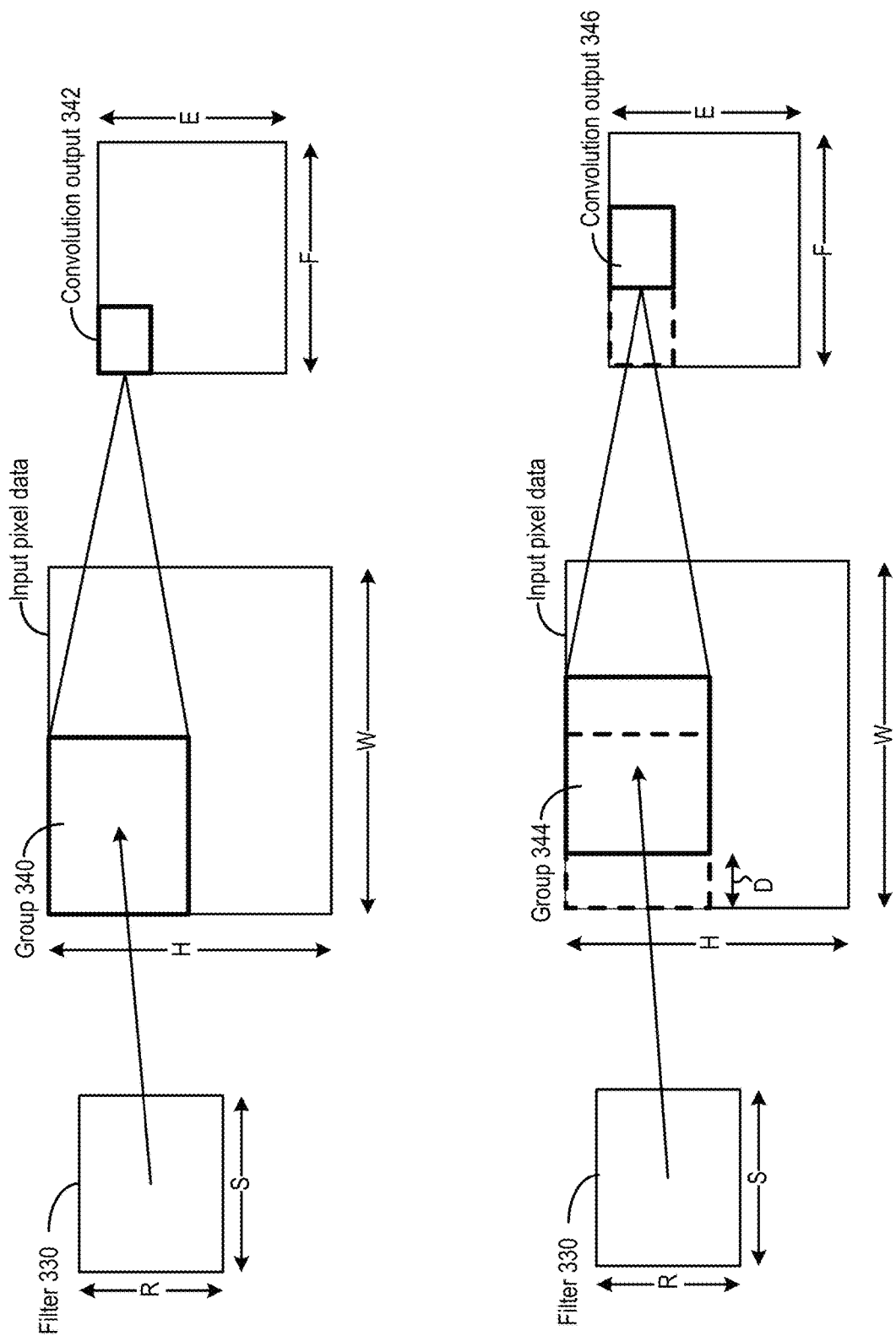

On the other hand, in a case where prediction model 203 is a CNN, each processing node of layer 309 may generate the sum based on the scaling of pixel values from a group of processing nodes of layers 307. The sum may represent a convolution result between a group of pixel values and a filter comprising the weight values. FIG. 3B illustrates an example of a convolution operation layer 309 may perform. In FIG. 3B, filter 330 may include a two-dimensional array of weights. The weights in filter 330 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 309 (e.g., processing node 310a) can receive, from a group of processing nodes of input layer 307, a group 340 of pixel values corresponding to a first rectangular block of pixels from the input image, and generate a convolution output 342 based on a summation of multiplication results between each weight of filter 330 and each corresponding pixel in group 340 according to Equation 1, to generate a dot-product between a matrix represented by filter 330 and a matrix represented by group 340. Another processing node of layer 309 can also receive, from another group of processing nodes of input layer 307, a group 344 of pixel values corresponding to a second rectangular block of pixels from the input image, and generate a convolution output 346 based on a summation of multiplication results between each weight of filter 330 and each corresponding pixel in group 244 according to Equation 1, to generate a dot-product between the matrix of filter 330 and a matrix represented by group 340. In some examples, each convolution output in FIG. 3B (e.g., convolution output 342, convolution output 346, etc.) can correspond to the output of a processing node of layer 309. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 3B, the convolution operations can be arranged in a sliding-window such that the second rectangular block overlaps, or otherwise adjacent to, the first rectangular block in the input image. For example, in the example of FIG. 3B, D may be a distance of stride (in pixel) of the sliding-window for each convolution operations, such that the block of pixels corresponding to group 344 may be situated at a distance D (in terms of pixels) from the block of pixels corresponding to group 340, and the next block of pixels may also be situated at the same distance D from group 344. Other processing node of layer 309 may also receive groups of pixels corresponding to other rectangular blocks and generate other intermediate outputs. The convolution outputs can be part of a convolution output array 380 with a height of E rows and a width of F columns. The array of convolution outputs can have a smaller height and a smaller width than the input image. Rectangular blocks of the convolution outputs can be further grouped, and convolution operations can be performed at layer 311 between the groups of convolution outputs and another set of filter weights to generate another set of convolution outputs.

Figure 3C:
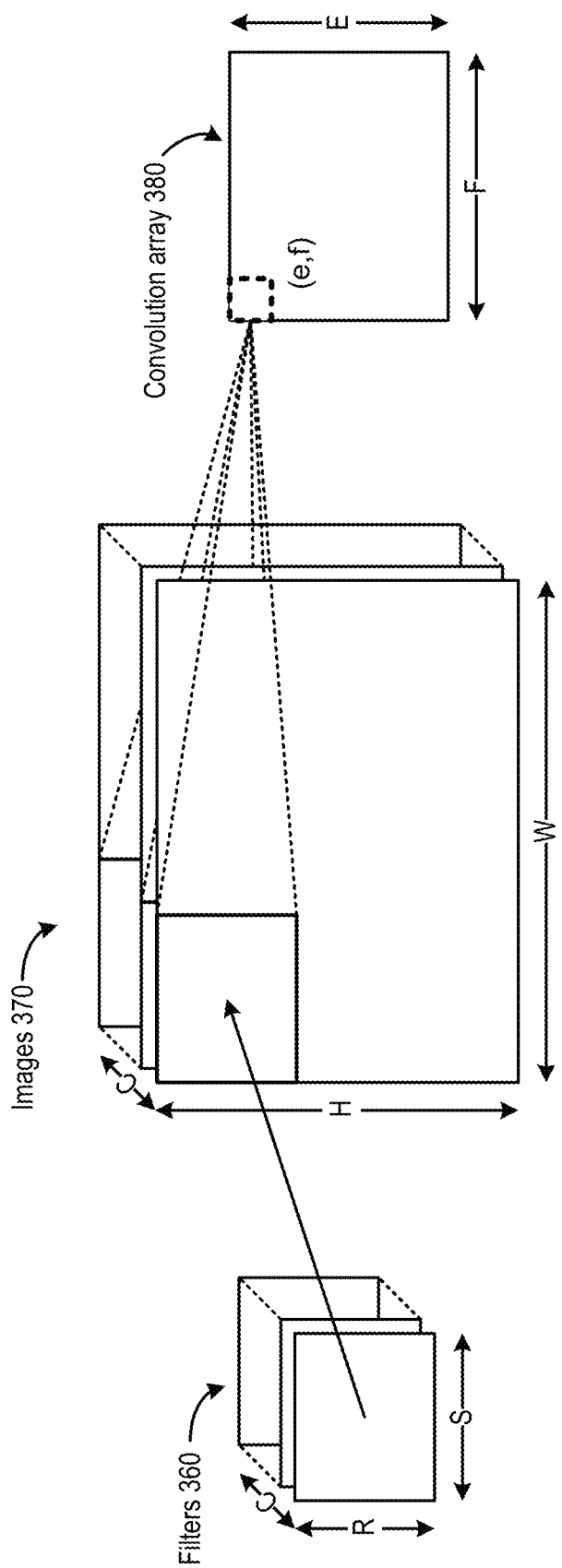

In some examples, the convolution operations can be performed between multiple images and multiple filters. For example, referring to FIG. 3C, a set of C filters 360 may corresponds to a number (C) of images 370, and convolution operations can be performed between each filter of the set of filters 360 and blocks of pixels on the corresponding image of images 370. The convolution results for each filter-image pair can be summed to generate a convolution output as follows:

$$O_{e,f} = \Sigma_{r=0}^{R-1} \Sigma_{s=0}^{S-1} \Sigma_{c=0}^{C-1} X^c_{eD+r,fD+s} \times W^c_{r,s} \quad \text{(Equation 2)}$$

Here, the convolution operation involves the images (or pixel arrays). $X^c_{eD+r,fD+s}$ may refer to the value of a pixel at an image of index c, within the number (C) of images 370, with a horizontal pixel coordinate of eD+r and a vertical pixel coordinate of fD+s. D is the sliding-window stride distance, whereas e and f correspond to the location of the output in the convolution output array, which can also correspond to a particular sliding window. Further, r and s correspond to a particular location within the sliding window. A pixel at an (r, s) location and of an image of index c can also correspond to a weight $W^c_{r,s}$ in a corresponding filter of the same index c at the same (r, s) location. Equation 2 indicates that to compute a convolution output $O_{e,f}$, each pixel within a sliding window (indexed by (e,f)) may be multiplied with a corresponding weight $W^c_{r,s}$. A partial sum of the multiplication products within each sliding window for each of the image within the image set can be computed. And then a sum of the partial sums for all images of the image set can be computed.

Moreover, in some examples, multiple sets of filters can be used to perform convolution operations with a set of images to generate a set of convolution output arrays, with each convolution output array corresponding to a set of filters. For example, the multiple sets of filters may correspond to multiple features to be detected from the set of images, and each convolution output array corresponds the detection results for each feature from the set of images. For example, in case where M sets of filters are applied to C images to generate M convolution output arrays, Equation 2 can be updated as follows:

$$O_{e,f}^m = \Sigma_{r=0}^{R-1} \Sigma_{s=0}^{S-1} \Sigma_{c=0}^{C-1} X^c_{eD+r,fD+s} \times W^{c,m}_{r,s} \quad \text{(Equation 3)}$$

Here, convolution output $O_{e,f}^m$ and weight $W^{c,m}_{r,s}$ has an index m corresponding to one of the M sets of filters.

Figure 3D:
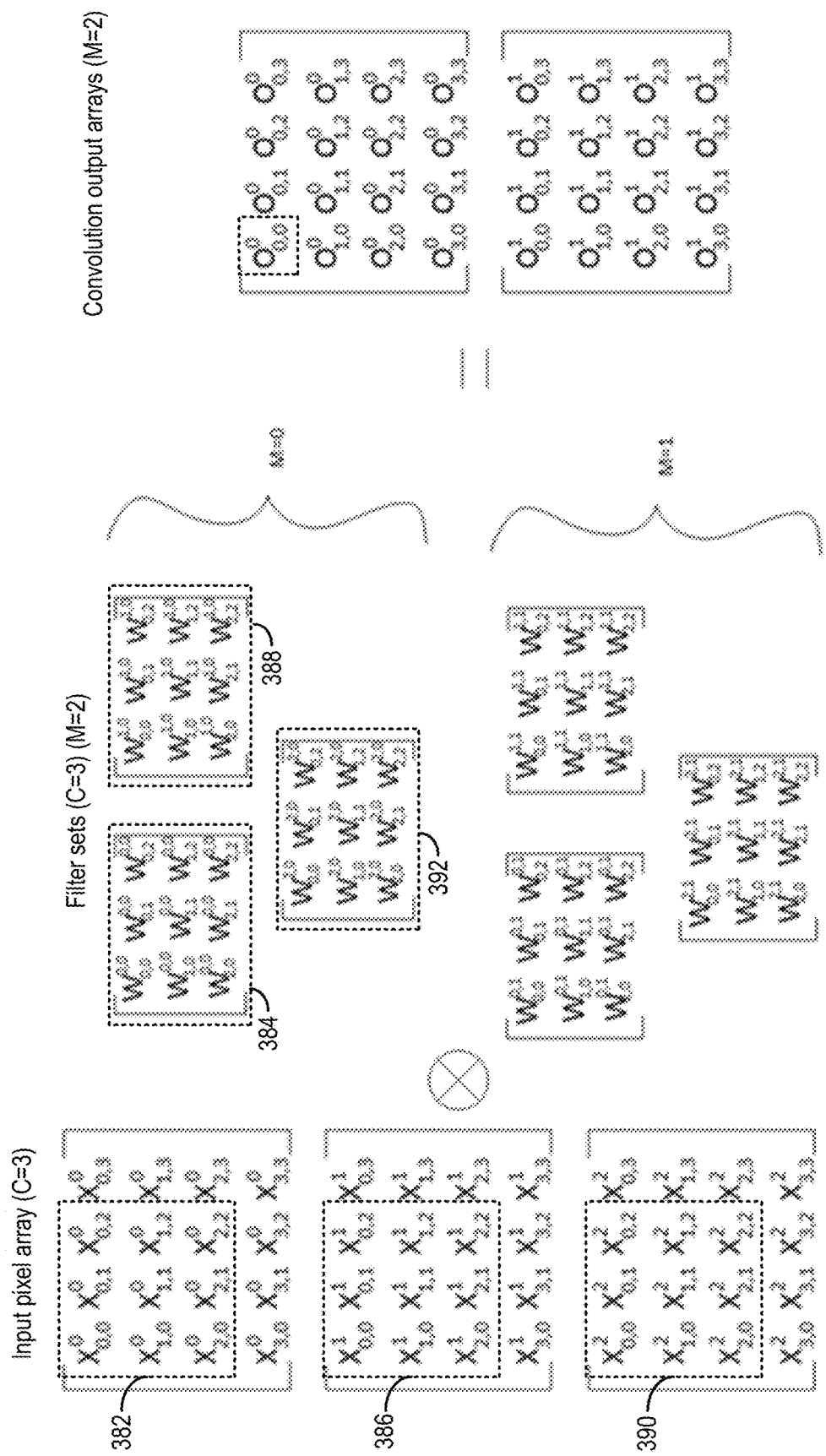

FIG. 3D illustrates an example of C sets of input data sets (with C=3) to be convolved with M sets of filters (with M=2). Each set of input data corresponds to the entries of a pixel array. Each of the M sets of filters includes a set of C filters which correspond to the C sets of input pixel arrays. The convolution operations generate M sets of output data sets, which each output data set corresponding to a convolution output array. Each convolution output array corresponds to convolving one set (of the M sets) of filters with the input pixel arrays. For example, $O_{0,0}^0$ can be generated by a sum of the dot-product between group of pixels 382 and filter array 384, the dot-product between group of pixels 386 and filter array 388, and the dot-product between group of pixels 390 and filter array 392.

Referring back to FIG. 3A, one processing node of layer 309 may be configured to generate the convolution outputs (e.g., one at a time) of one convolution output array, and a set M of processing nodes of layer 309 can correspond to a set M of convolution output arrays. The processing node of layer 309 can also process each convolution output with an activation function to generate an activation output. The activation function may translate the convolution output into a decision of whether to forward the convolution output to intermediate layer 311 to influence the classifier decision (analogous to the firing of an actual biological neuron). An example of activation function can be a rectified linear unit (ReLu) defined according to the following equation:

$$\text{ReLu}(y) = \max(0, y) \quad \text{(Equation 4)}$$

A processing node of layer 309 (e.g., processing node 310a) may process the sum with the ReLu function to generate a first intermediate output based on the following equation:

$$\text{first\_intermediate\_output}_{210a} = \text{ReLu}(\text{Sum}_{310a}) \quad \text{(Equation 5)}$$

In a case where prediction model 103 is a CNN, prediction model 103 may include a pooling layer (not shown in FIG. 3A) to reduce the size of the first intermediate outputs. For example, the pooling layer may perform down-sampling operation and forward a maximum intermediate output (generated based on the ReLu function) among a group of intermediate outputs (while discarding the rest of the intermediate outputs in the group) to layer 311.

Layer 311 may further process the scaled intermediate outputs from layer 309 by, for example performing additional convolution operations based on a different sets of filters. The outputs from each processing node of layer 311 may be forwarded to other higher intermediate layers, or to an output layer (not shown in FIG. 3A). The output layer may form an output vector representing, for example, a probability that certain features are included in image 204, and/or a probability that image 204 includes an image of a panda. For example, the output vector may be compared against a reference vector associated with a nose object of a panda, or a reference vector associated with a panda. A decision about whether image 204 is an image of a panda can be determined based on the comparison result.

Figure 4A:
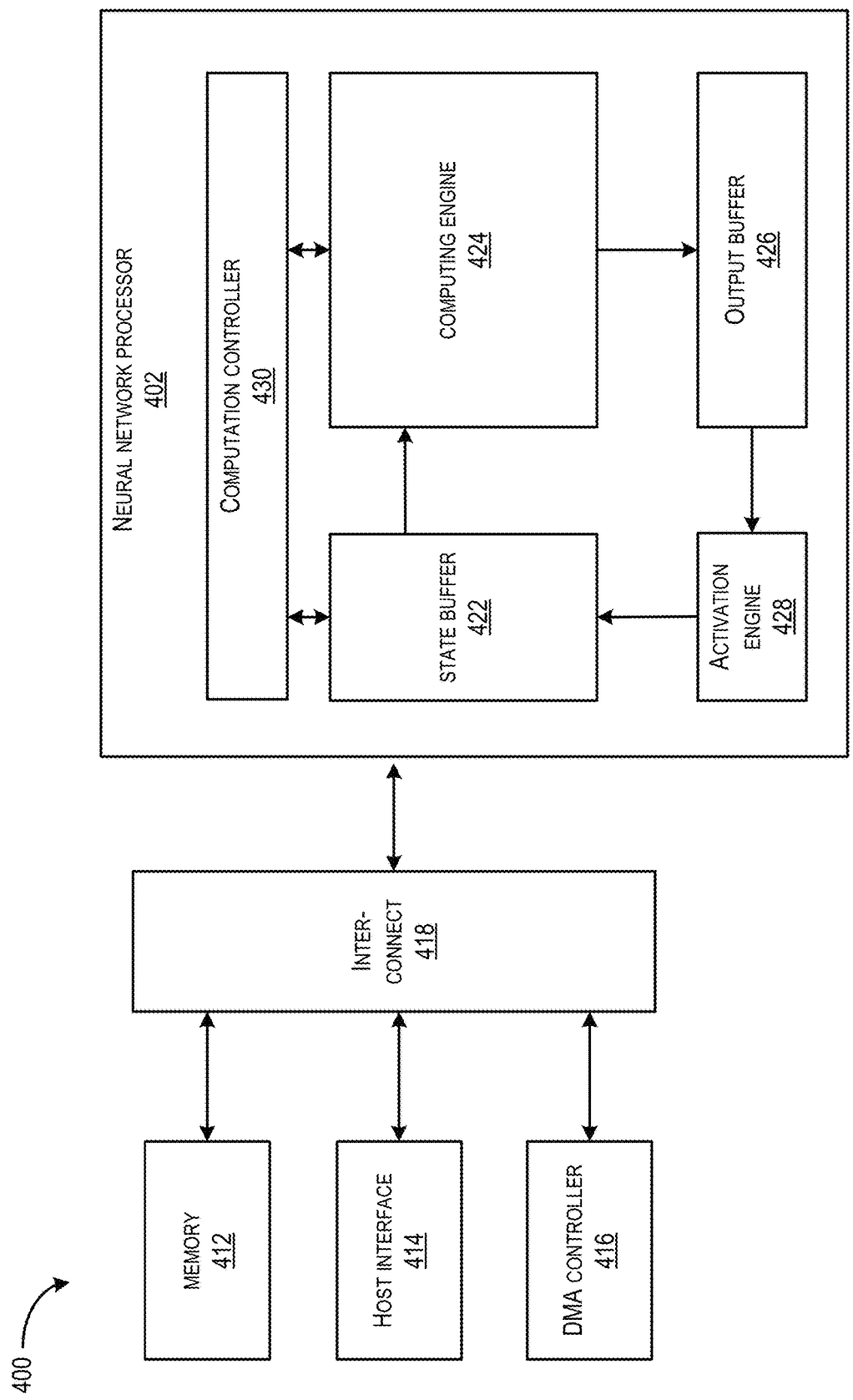
FIGS. 4A-4C are simplified block diagrams for some of the components of an apparatus for implementing the prediction model of FIGS. 3A-3D, according to certain aspects of the present disclosure.

FIG. 4A shows an apparatus 400 according to some embodiments of the present disclosure. Apparatus 400 may be part of a computer system, e.g., a host server. Apparatus 400 may be part of a multi-tenant compute service system and can communicate with a host device (not shown in FIG. 4A) to provide computing and memory resources for a computing service. For example, referring back to FIG. 2, apparatus 400 may provide computing and memory resources for computations with prediction model 203. A host device can operate software application 202 and communicate with apparatus 400 to perform one or more image recognition tasks based on computations with prediction model 203.

In the example of FIG. 4A, apparatus 400 may include a neural network processor 402 coupled to memory 412, a direct memory access (DMA) controller 416, and a host interface 414 via an interconnect 418. As to be discussed in more details, neural network processor 402 can provide the computing resources to support the computations with prediction model 403. Memory 412 may be configured to store the instructions, input data (e.g., input pixel groups 382, 386, and 390) and the weights (e.g., weights from filter arrays 384, 388, and 392) received from the host device. Memory 412 may also be configured to store the output of Neural network processor 402 (e.g., one or more image recognition decisions on the input images) at memory 412. Memory 412 may include any suitable memory, e.g., dynamic random access memory (DRAM), synchronous DRAM (SDRAM), double data rate DRAM (DDR DRAM), storage class memory (SCM), flash memory devices, etc.

DMA controller 416 may be configured to perform DMA operations to transfer data between Neural network processor 402 and the host device. For example, as discussed above, the host device can store the instructions, input data, and the weights at memory 412. The host device can provide the memory addresses for the stored instructions, data and weights to neural network processor 402 (e.g., in the form of memory descriptors). Neural network processor 402 can then obtain the stored instructions, data, and weights based on the memory addresses provided by the host device. Neural network processor 402 can also store the results of computations (e.g., one or more image recognition decisions) at memory 412, and provide the memory addresses for the stored results to the host device.

Host interface 414 may be configured to enable communication between the host device and neural network processor 402. For example, host interface 414 may be configured to transmit the memory descriptors including the memory addresses of the stored data (e.g., input data, weights, results of computations, etc.) between the host device and neural network processor 402. Host interface 414 may include, for example, a peripheral component interconnect express (PCIe) interface or any suitable interface for communicating with the host device.

Neural network processor 402 can provide the computing resources to support the computations with prediction model 203. In the example of FIG. 4A, neural network processor 402 may include a state buffer 422, a computing engine 424, an output buffer 426, an activation engine 428, and a computation controller 430.

State buffer 422 may be configured to provide caching of data used for computations at computing engine 424. The data cached at state buffer 422 may include, for example, the input data and weights obtained acquired from memory 412, as well as intermediate outputs of computations at computing engine 424. The caching can reduce the effect of memory access bottleneck (e.g., caused by the latencies at memory 412, DMA controller 416, interconnect 418, etc.) on the performance of computing engine 424. As to be discussed in more detail below, state buffer 422 can be controlled by computation controller 430 to dynamically vary a number of sets of input data provided to computing engine 424, to update a mapping between the sets of input data to the inputs of computing engine 424. The updating of the mapping can be performed to improve the utilization rate as well as the processing speed of Neural network processor 402 for the sets of input data. State buffer 422 can be an on-chip memory device and may include, for example, static random access memory (SRAM).

Computing engine 424 may include a set of processing elements configured to perform one or more arithmetic operations involved in neural network computations. For example, computing engine 424 may include a set of multipliers to perform the scaling of input data with associated weights, and a set of adders to generate a sum of the results of multiplications representing dot-products and convolution results, as discussed above. The weights and the input data can be obtained from state buffer 422.

In addition, neural network processor 402 also includes an output buffer 426. Output buffer 426 includes a set of registers to store the outputs of computing engine 424. Output buffer 426 also enables additional processing such as, for example, pooling operation to reduce the size of the stored outputs. In some examples, computing engine 424 can be operated to perform computations for a particular neural network layer, and output buffer 426 can process the outputs of that neural network layer and store the processed outputs (with or without processing by activation engine 428) at state buffer 422. As to be discussed in details below, output buffer 426 may include circuitries to shrink or expand a number of output data sets stored at state buffer 422, to dynamically update a mapping between the output data sets (as stored in state buffer 422) and the outputs of computing engine 424. The updating of the mapping can also be performed to improve the utilization rate as well as the processing speed of neural network processor 402 for a set of input data.

In addition, activation engine 428 can be configured to apply one or more activation functions (e.g., ReLu function) on the output of output buffer 426. For example, activation engine 428 may include one or more lookup tables (e.g., in the form of multiplexer circuits) that map the input to one of the candidate outputs representing the result of applying the activation function to the input. In some examples, the activation engine 428 may also include a by-pass path to allow outputs from output buffer 426 to be stored directly at output buffer 426 when activation functions are not to be applied.

Figure 4B:
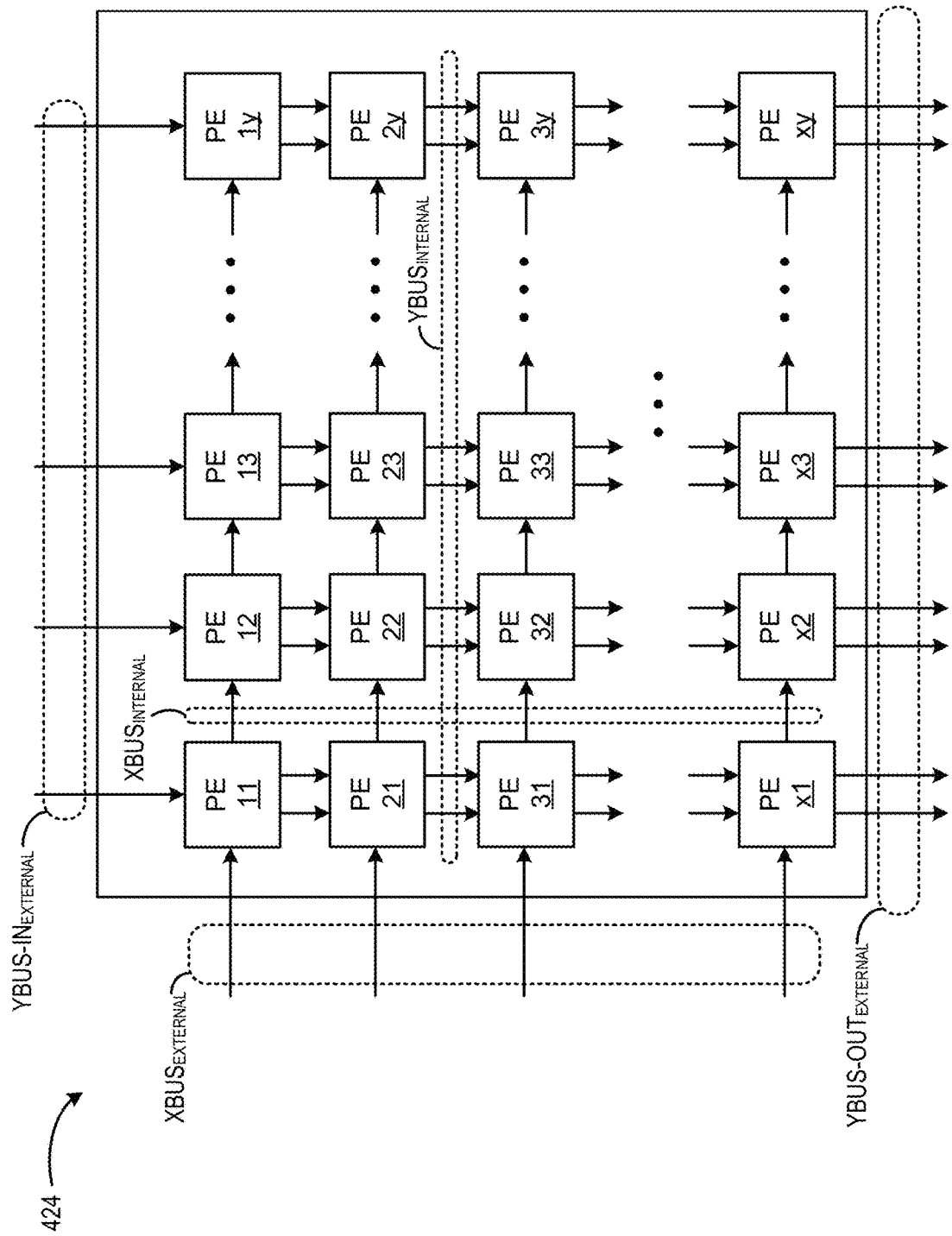

FIG. 4B illustrates an example of an internal structure of computing engine 424. Computing engine 424 may include a two-dimensional array of processing elements (PE) arranged in multiple rows and columns, where the rows can represent a first dimension and the columns can represent a second dimension. As used herein, "rows" and "columns" are interchangeable and are used to represent different dimensions of a two-dimensional array. Each PE may correspond to a DPU in systolic array 100 but include additional arithmetic units, as to be discussed below. Neighboring PEs within each row (e.g., PEs 11, 12, 13, . . . 1y) are connected with each other via internal row buses $XBUS_{INTERNAL}$, whereas PEs 11, 21, 31, . . . x1 of the leftmost column are connected to state buffer 422 via a set of external row buses $XBUS_{EXTERNAL}$. As to be discussed in more detail below, state buffer 422 can update a mapping of the input data sets to the set of external row buses $XBUS_{EXTERNAL}$. The updated mapping can change a number of effective rows of the array of PEs, which in turns changes a number of input data sets the array of PEs is capable of receiving (and processing) at a given time. Moreover, neighboring PEs within each column are connected with each other via internal column buses $YBUS_{INTERNAL}$. PEs 11, 12, 13, . . . 1y of the topmost row are connected to state buffer 422 via a set of external input column buses $YBUS\text{-}IN_{EXTERNAL}$. External internal input column buses $YBUS\text{-}IN_{EXTERNAL}$ may be driven by computation controller 430 to zero to, for example, reset the computations in computing engine 424. Further, PEs x1, x2, x3, . . . , xy of the bottom row are connected to output buffer 426 via a set of external column buses $YBUS\text{-}OUT_{EXTERNAL}$. As to be discussed in more detail below, output buffer 426 can update a mapping of the output data sets to the set of external column buses $YBUS\text{-}OUT_{EXTERNAL}$. The updated mapping can change a number of effective columns of the array of PEs, which in turn changes a number of output data sets neural network processor 402 is capable of outputting at a given time. The number of effective columns may also reflect a number of processing nodes of a neural network layer (e.g., layers 307, 309, 311, etc.) implemented by computing engine 424.

Figure 4C:
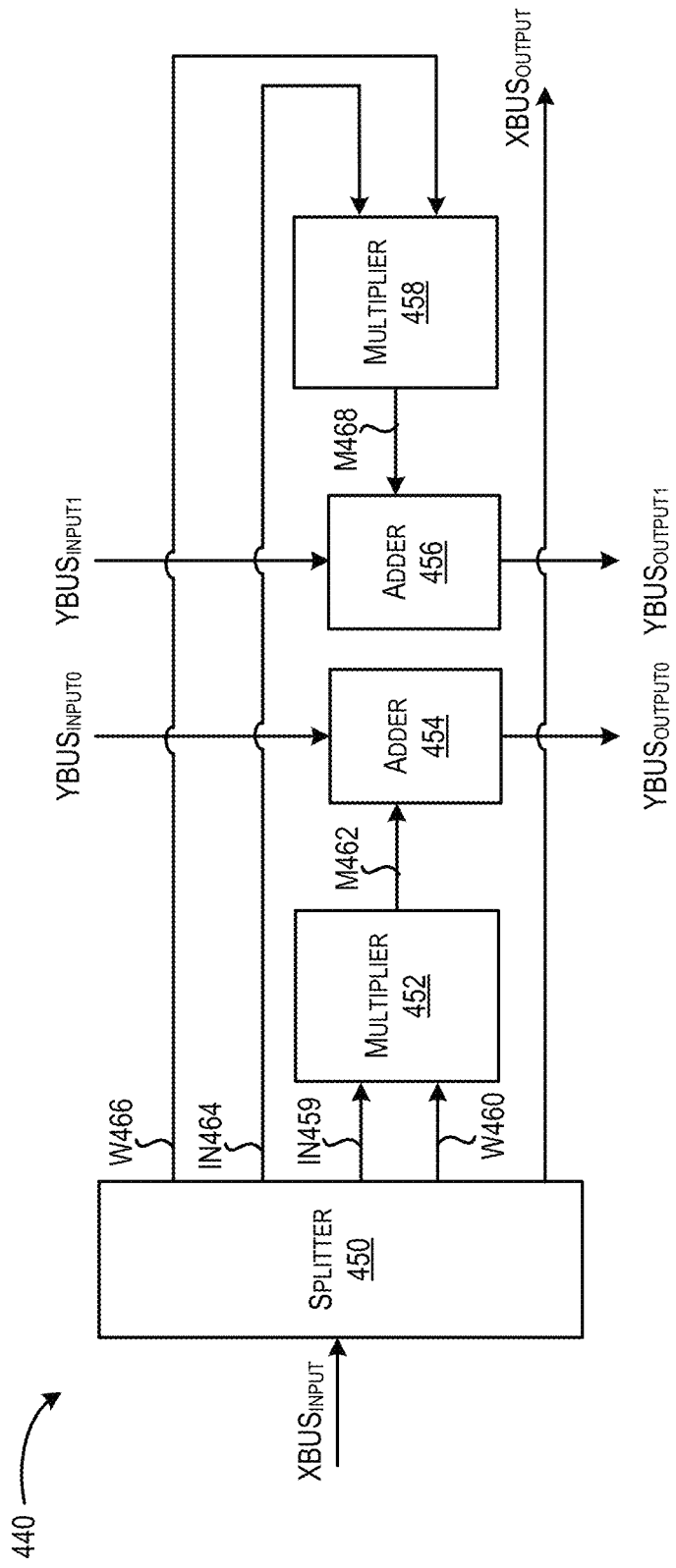

FIG. 4C illustrates an example of an internal structure of a PE 440, which can be any one of the PEs described in FIG. 4B. PE 440 may include a splitter 450, a first multiplier 452, a first adder 454, a second adder 456, and a second multiplier 458. Both of first adder 454 and second adder 456 can be 8-bit adders, whereas first multiplier 452 and second multiplier 458 can be 8-bit multipliers. Splitter 450 may receive a set of data from an input XBUS (e.g., $XBUS_{INPUT}$) and extract the input values and weights. For example, PE 11 may receive, from $XBUS_{IN}$, a set of input values and weights not just for PE 11 but also for other PEs of the same row. Splitter 450 can forward the data of $XBUS_{IN}$, via an output XBUS ($XBUS_{OUTPUT}$), to the next PE within the same row. Moreover, splitter 450 can extract an input value (e.g., IN459) and a weight value (e.g., W460) from the data on $XBUS_{IN}$, and provide the extracted values to first multiplier 452 to generate a first multiplication result (e.g., M462). Splitter 450 can also extract an input value (e.g., IN464) and a weight value (e.g., W466) from the data on $XBUS_{IN}$, and provide the extracted values to second multiplier 458 to generate a second multiplication result (e.g., M468). As to be discussed below, depending on a configuration of computing engine 424, same input value or different input values may be provided to each of first multiplier 452 and second multiplier 458. Moreover, splitter 450 may also split an input value and a weight value of a certain length (e.g., 16 bits) into two input split values and two weight split values with half of the lengths (8-bits), and provide each of two input split values and each of the two weight split values to, respectively, first multiplier 452 and second multiplier 458.

In addition, adder 454 can receive a first partial sum received from a prior PE within the same column via a first input YBUS (e.g., $YBUS_{INPUT0}$). The first partial sum may represent a sum of all of the first multiplication results generated by each of the PEs within that column and up to that prior PE. Adder 454 can add the first partial sum to the first multiplication result (e.g., M462) to generate an updated first partial sum, and transmit the updated first partial sum to the next PE within the same column via a first output YBUS (e.g., $YBUS_{OUTPUT0}$). Adder 456 can also add a second partial sum received from that prior PE (representing a sum of all of the second multiplication results generated by each of the PEs up to that prior PE) via a second input YBUS (e.g., $YBUS_{INPUT1}$) to the second multiplication result (e.g., M468) to generate an updated second partial sum, and transmit the updated second partial sum to the next PE within the same column via a second output YBUS (e.g., $YBUS_{OUTPUT1}$).

Figure 5A:
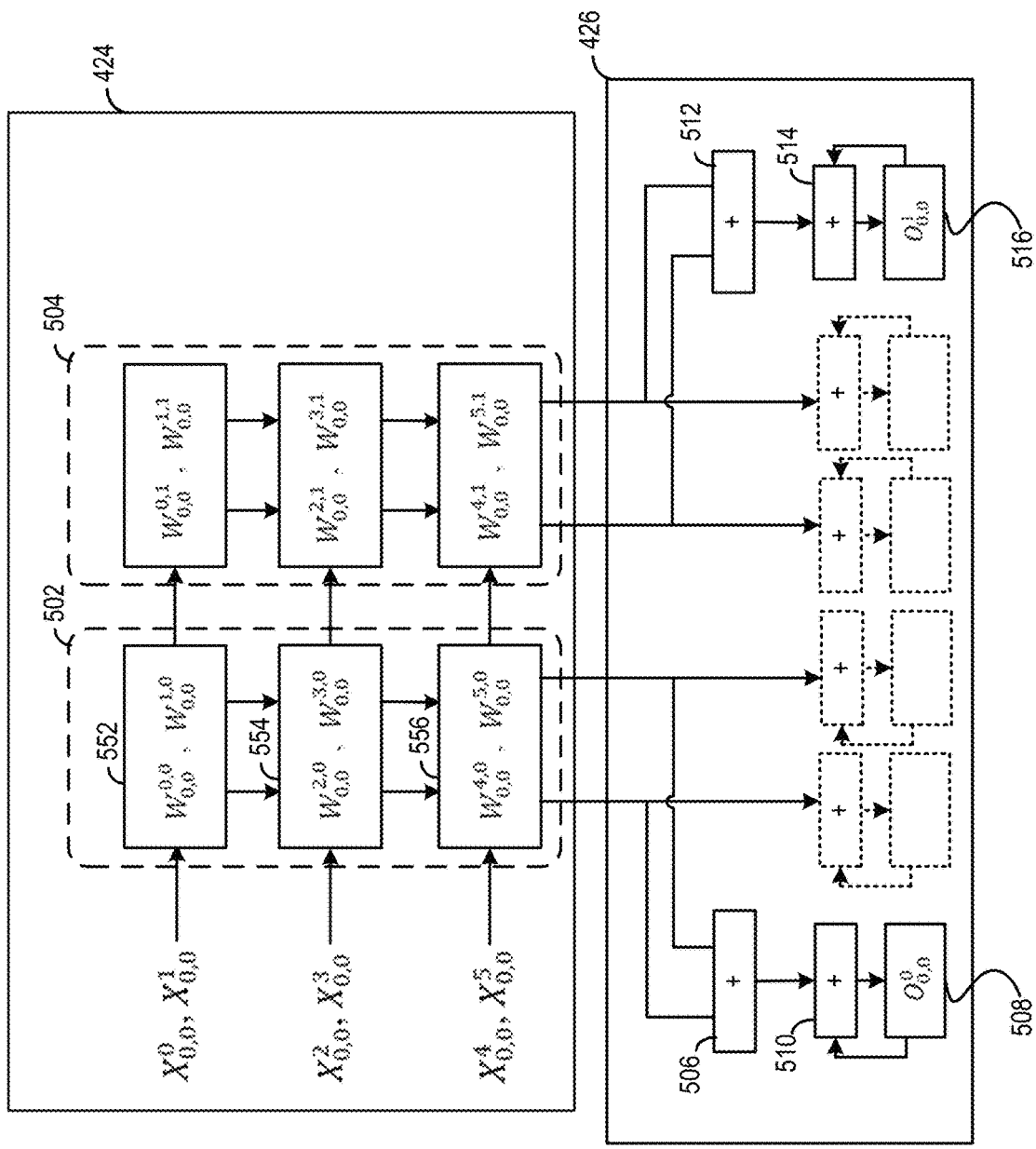
FIGS. 5A-5B are simplified block diagrams illustrating different configurations of the apparatus of FIGS. 4A-4C.
Figure 5B:
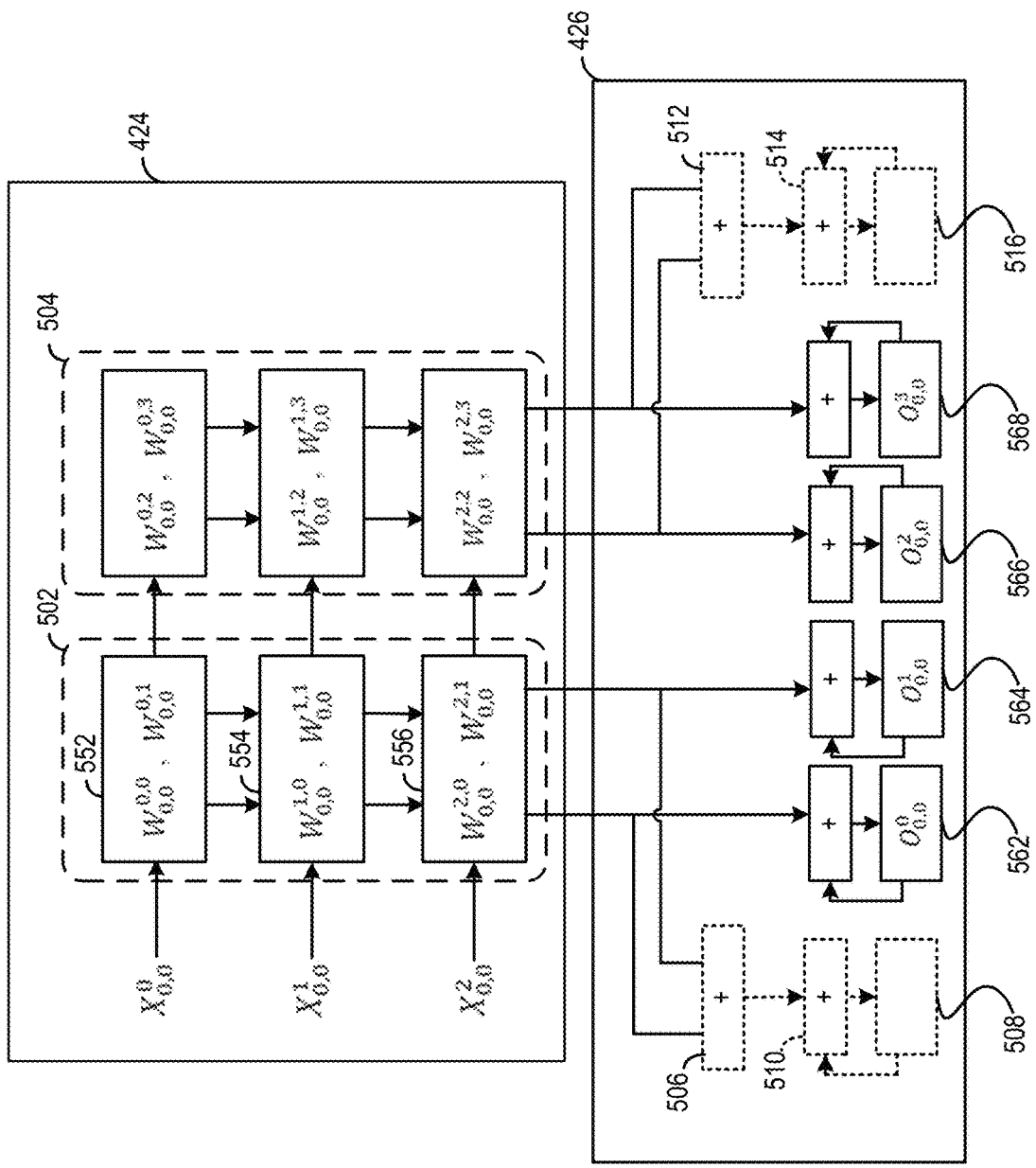

Reference is now made to FIG. 5A, which illustrates an example of a configuration of computing engine 424 and output buffer 426 where the effective number of rows (e.g., a first effective dimension of the array of PEs of computing engine 424) is doubled. In the example of FIG. 5B, instead of three input data sets, computing engine 424 may be configured to receive six input data sets (e.g., corresponding to C=6 in Equations 2 and 3, or six input pixel arrays), and to generate two output data sets (e.g., with M=2 in Equation 3). Each input value and weight value can be 8-bit numbers.

In this configuration, each processing element may receive two input data sets, and generate a first product and a second product. For example, in the first pass, PE 552 of column 502 may receive $X_{0,0}^0$ (of a first pixel array) and $X_{0,0}^1$ (of a second pixel array) and the associated weights $W_{0,0}^{0,0}$ and $W_{0,0}^{1,0}$ (of the first filter set) and generate a first multiplication result of $X_{0,0}^0 \times W_{0,0}^{0,0}$ and a second multiplication result of $X_{0,0}^1 \times W_{0,0}^{1,0}$. Also, PE 554 of column 502 may receive $X_{0,0}^2$ (of a third pixel array) and $X_{0,0}^3$ (of a fourth pixel array) and the associated weights $W_{0,0}^{2,0}$ and $W_{0,0}^{3,0}$ (of the first filter set), and generate a first multiplication result $X_{0,0}^2 \times W_{0,0}^{2,0}$ and a second multiplication result $X_{0,0}^3 \times W_{0,0}^{3,0}$. Further, PE 556 of column 502 may receive $X_{0,0}^4$ (of a fifth pixel array) and $X_{0,0}^5$ (of a sixth pixel array) and the associated weights $W_{0,0}^{4,0}$ and $W_{0,0}^{5,0}$ (of the first filter set), and generate a first multiplication result $X_{0,0}^4 \times W_{0,0}^{4,0}$ and a second multiplication result $X_{0,0}^5 \times W_{0,0}^{5,0}$. Moreover, each PE of column 502 also accumulates the two multiplication results, and column 502 may generate a first partial sum and the second partial sum based on the following equations:

$$\text{First partial sum (first pass)} = X_{0,0}^0 \times W_{0,0}^{0,0} + X_{0,0}^2 \times W_{0,0}^{2,0} + X_{0,0}^4 \times W_{0,0}^{4,0} \quad \text{(Equation 6)}$$

$$\text{Second partial sum (first pass)} = X_{0,0}^1 \times W_{0,0}^{1,0} + X_{0,0}^3 \times W_{0,0}^{3,0} + X_{0,0}^5 \times W_{0,0}^{5,0} \quad \text{(Equation 7)}$$

Output buffer 426 may receive the first partial sum and the second partial sum, and generate a first partial output of $O_{0,0}^0$ by adding the first partial sum and the second partial sum with adder 506, based on the following equation:

$$\text{First partial output for } O_{0,0}^0 \text{ (first pass)} = X_{0,0}^0 \times W_{0,0}^{0,0} + X_{0,0}^1 \times W_{0,0}^{1,0} + X_{0,0}^2 \times W_{0,0}^{2,0} + X_{0,0}^3 \times W_{0,0}^{3,0} + X_{0,0}^4 \times W_{0,0}^{4,0} + X_{0,0}^5 \times W_{0,0}^{5,0} \quad \text{(Equation 8)}$$

The first partial output for $O_{0,0}^0$ can be stored in buffer 508, and can be accumulated, with adder 510, with the subsequent partial outputs for $O_{0,0}^0$ generated in subsequent passes, as discussed above. The final output value of $O_{0,0}^0$ at buffer 508 can be retrieved by computation controller 430 and can be stored at state buffer 422.

Moreover, column 442 also generate a third partial sum and a fourth partial sum as follows:

$$\text{Third partial sum (first pass)} = X_{0,0}^0 \times W_{0,0}^{0,1} + X_{0,0}^2 \times W_{0,0}^{2,1} + X_{0,0}^4 \times W_{0,0}^{4,1} \quad \text{(Equation 9)}$$

$$\text{Fourth partial sum (first pass)} = X_{0,0}^1 \times W_{0,0}^{1,1} + X_{0,0}^3 \times W_{0,0}^{3,1} + X_{0,0}^5 \times W_{0,0}^{5,1} \quad \text{(Equation 10)}$$

Output buffer 426 may receive the third partial sum and the fourth partial sum, and generate a first partial output of $O_{0,0}^1$ by adding the third partial sum and the fourth partial sum with adder 512, based on the following equation:

$$\text{First partial output for } O_{0,0}^1 \text{ (first pass)} = X_{0,0}^0 \times W_{0,0}^{0,1} + X_{0,0}^2 \times W_{0,0}^{2,1} + X_{0,0}^4 \times W_{0,0}^{4,1} + X_{0,0}^1 \times W_{0,0}^{1,1} + X_{0,0}^3 \times W_{0,0}^{3,1} + X_{0,0}^5 \times W_{0,0}^{5,1} \quad \text{(Equation 11)}$$

The first partial output for $O_{0,0}^1$ can be stored in buffer 446, and can be accumulated, with adder 514, with subsequent partial outputs for $O_{0,0}^1$ generated in subsequent passes, as discussed above. The final output value of $O_{0,0}^1$ at buffer 516 can also be retrieved by computation controller 430 and can be stored at state buffer 422.

In this configuration, the effective number of rows of computing engine 424 is doubled such that the number of input data sets processed by each row of the processing elements doubles. A determination to double the effective number of rows may be made by computation controller 430. The determination can be based on, for example, the size of the input data and weight (e.g., a number of bits included in $X_{0,0}^0$ and $W_{0,0}^{0,0}$). For example, based on a determination that each of $X_{0,0}^0$ and $W_{0,0}^{0,0}$ is an 8-bit number, computation controller 430 may determine to send two input values and two weight values to each PE to more fully utilize the arithmetic hardware. As another example, computation controller 430 may also determine to double the effective number of rows based on the number of input data sets (e.g., the value C in Equations 2 and 3) exceeding the number of rows of processing elements in computing engine 424, as illustrated in the example of FIG. 5A. In both cases, by doubling the number of input data sets provided to and processed by each PE at a given time, the total time for processing all of the input data sets can be reduced, while the utilization rate of the computing engine 424 can also be improved or at least can be maintained.

Reference is now made to FIG. 5B, which illustrates an example of a configuration of computing engine 424 and output buffer 426 where the effective number of columns (e.g., a second effective dimension of the array of PEs of computing engine 424) is doubled. In the example of FIG. 5B, computing engine 424 may be configured to receive three input data sets (e.g., corresponding to C=3 in Equations 2 and 3, or six input pixel arrays), and to generate four output data sets (e.g., with M=4 in Equation 3). The change in the number of output data sets may be due to, for example, a change in the number of filter sets to be applied.

In this configuration, each processing element may receive one input value of one input data sets. Each processing element also receives a first weight and a second weight from two different filter sets. Each processing element then generates a first product of the one input element and the first weight, and a second product of the one input element and the second weight. For example, in the first pass, PE 552 of column 502 may receive $X_{0,0}^0$ (of a first pixel array) and the associated weights $W_{0,0}^{0,0}$ (of first filter set) and $W_{0,0}^{0,1}$ (of the second filter set) and generate a first multiplication result $X_{0,0}^0 \times W_{0,0}^{0,0}$ and a second multiplication result $X_{0,0}^0 \times W_{0,0}^{0,1}$. Also, PE 554 of column 502 may receive $X_{0,0}^1$ (of a second pixel array) and the associated weights $W_{0,0}^{1,0}$ (of the first filter set) and $W_{0,0}^{1,1}$ (of the second filter set), and generate a first multiplication result $X_{0,0}^1 \times W_{0,0}^{1,1}$ and a second multiplication result $X_{0,0}^1 \times W_{0,0}^{1,1}$. Further, PE 556 of column 502 may receive $X_{0,0}^2$ (of a third pixel array) and the associated weights $W_{0,0}^{2,0}$ (of the first filter set) and $W_{0,0}^{2,1}$ (of the second filter set), and generate a first multiplication result $X_{0,0}^2 \times W_{0,0}^{2,0}$ and a second multiplication result $X_{0,0}^2 \times W_{0,0}^{2,1}$. Moreover, each PE of column 502 also accumulates the two multiplication results, and column 502 may generate a first partial sum and a second partial sum based on the following equations:

$$\text{First partial sum (first pass)} = X_{0,0}^0 \times W_{0,0}^{0,0} + X_{0,0}^1 \times W_{0,0}^{1,0} + X_{0,0}^2 \times W_{0,0}^{2,0} \quad \text{(Equation 12)}$$

$$\text{Second partial sum (first pass)} = X_{0,0}^0 \times W_{0,0}^{0,1} + X_{0,0}^1 \times W_{0,0}^{1,1} + X_{0,0}^2 \times W_{0,0}^{2,1} \quad \text{(Equation 13)}$$

The two partial sums are stored in buffers 562 and 564 of output buffer 426 as two separate outputs, rather than being added together with adder 506. The two partial sums can be accumulated with other the partial sums generated by column 502 in subsequent passes. The final output values stored in buffers 562 and 564 can be retrieved by computation controller 430 and can be stored at state buffer 422 as the outputs for $O_{0,0}{}^0$ and $O_{0,0}{}^1$.

Similarly, column 504 also receives input elements $X_{0,0}{}^0$ (of the first pixel array), $X_{0,0}{}^1$ (of the second pixel array), and $X_{0,0}{}^2$ (of the third pixel array). Column 442 also receives the weights $W_{0,0}{}^{0,2}$, $W_{0,0}{}^{1,2}$, and $W_{0,0}{}^{2,2}$ (of the third filter set) and $W_{0,0}{}^{0,3}$, $W_{0,0}{}^{1,3}$, and $W_{0,0}{}^{2,2}$ (of the fourth filter set), and generate a third partial sum and a fourth partial sum, based on the following equations:

Third partial sum (first pass)=$X_{0,0}{}^0 \times W_{0,0}{}^{0,2} + X_{0,0}{}^1 \times W_{0,0}{}^{1,2} + X_{0,0}{}^2 \times W_{0,0}{}^{2,2}$  (Equation 14)

Fourth partial sum (first pass)=$X_{0,0}{}^0 \times W_{0,0}{}^{0,3} + X_{0,0}{}^1 \times W_{0,0}{}^{1,3} + X_{0,0}{}^2 \times W_{0,0}{}^{2,3}$  (Equation 15)

The two partial sums are stored in buffers 566 and 568 of output buffer 426. The final output values stored in buffers 566 and 568 can be retrieved by computation controller 430 and can be stored at state buffer 422 as the outputs for $O_{0,0}{}^2$ and $O_{0,0}{}^3$.

In this configuration, the effective number of columns of computing engine 424 is doubled such that the number of output data sets generated by each column of the processing elements doubles. A determination to double the effective number of columns may be made by computation controller 430. The determination can be based on, for example, the number of sets of filters (e.g., corresponding to additional features) doubles, and the number of output data sets (e.g., the value M in Equation 3) doubles as well. The determination can also be based on a number of processing nodes to be emulated in a neural network layer changes when, for example, computing engine 424 completes the computations for one neural network layer to another neural network layer. If the number of output data sets exceeds the number of columns of processing elements in computing engine 424, computation controller 430 may determine to double the effective number of columns of computing engine 424.

In some examples, computation controller 430 may dynamically switch between the configuration of FIG. 5A (where an effective number of rows doubles) and the configuration of FIG. 5B (where an effective number of columns doubles) at any time during the computations and needs not wait until the computations for one neural network layer complete. The switching can be triggered by, for example, a change in a number of input data sets provided to computing engine 424 at a particular time, a change in a number of output data sets to be generated by computing engine 424, etc. These changes can be made to, for example, free up the resources at computing engine 424 for other computations (e.g., to process other input data sets for another tenant), accommodate the computation need for software application 202, etc.

Figure 6:
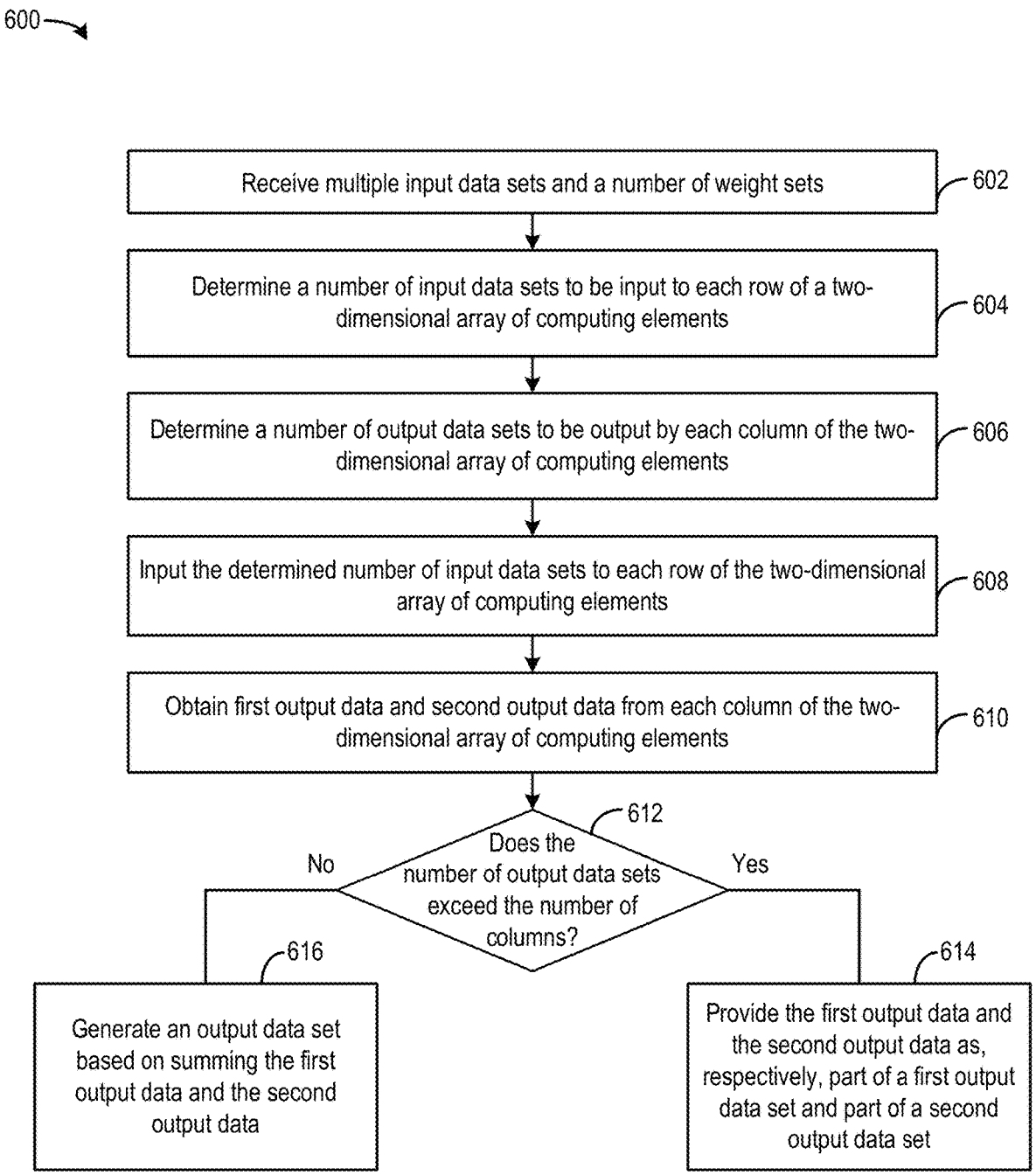
FIG. 6 illustrates an example flow diagram of performing multi-layer neural network processing of multiple sets of data, according to certain aspects of the present disclosure.

FIG. 6 illustrates an example flow diagram of a process 600 for operating an array of processing elements. Process 600 may be implemented by, for example, neural network processor 402 where computation controller 430 configures computing engine 424 and output buffer 426 to perform a set of computations. The computations may include, for example, computations for a deep neural network (DNN), a convolutional neural network (CNN), etc.

At operation 602, computation controller 430 receives multiple input data sets and a number of weight sets. Each input data set may correspond to, for example, a pixel array. Each weight set may correspond to, for example, a set of filters to be applied to the pixel array.

At operation 604, computation controller 430 determines a number of input data sets to be input to each row of the two-dimensional array of processing elements of computing engine 424. The number of input data sets to be input can be determined based on, for example, a number of bits of the input data, whether the number of input data sets received at operation 602 exceeds the number of rows of the two dimensional array, etc. In a case where multiple sets of input data are provided to each row, the effective number of rows is increased.

At operation 606, computation controller 430 also determines a number of output data sets to be output by each column of the two-dimensional array of processing elements. The number of output data sets can be determined based on, for example, a number of sets of filters to be applied, a number of processing nodes in the neural network layer, etc.

At operation 608, computation controller 430 inputs the determined number of input data sets (determined at operation 606) to each row of the two-dimensional array of processing elements. Each PE may generate a first multiplication result and a second multiplication result. In a case where two input data sets are sent to each row, the first multiplication result and the second multiplication result may correspond to, for example, a first multiplication between a first input value and a first weight value and a second multiplication between a second input value and a second weight value. In a case where a single input data set is sent to each row, the first multiplication result and the second multiplication result may correspond to, for example, a first multiplication between an input value and a first weight and a second multiplication between the input value and a second weight. The first multiplication result and the second multiplication result may also correspond to, for example, multiplications between different sets of bits of the input value and the weight value. Each PE also receives a first partial sum of the first multiplication results and a second partial sum of the second multiplication results from a prior PE in the same column, adds the first multiplication result to the received first partial sum and the second multiplication result to the received second partial, and transmits the updated first partial sum and updated second partial sum to the next PE of the column.

At operation 610, output buffer 426 obtains first output data and second output data from each column of the two-dimensional array of processing elements. The first output data and the second output data may correspond to, respectively, a sum of the first multiplication results and a sum of the second multiplication results accumulated by each PE.

At operation 612, computation controller 430 determines whether the number of output data sets (determined at operation 606) exceeds the number of columns. If the number of output data sets exceeds the number of columns, computation controller 430 may proceed to operation 614 and provide the first output data and the second output data as, respectively, part of a first output data set and part of a second output data set for each column, to increase the number of effective columns. On the other hand, if the number of output data sets does not exceed the number of columns (at operation 612), computation controller 430 may proceed to operation 616 and generate an output data set for each column based on summing the first output data and the second output data.

Figure 7:
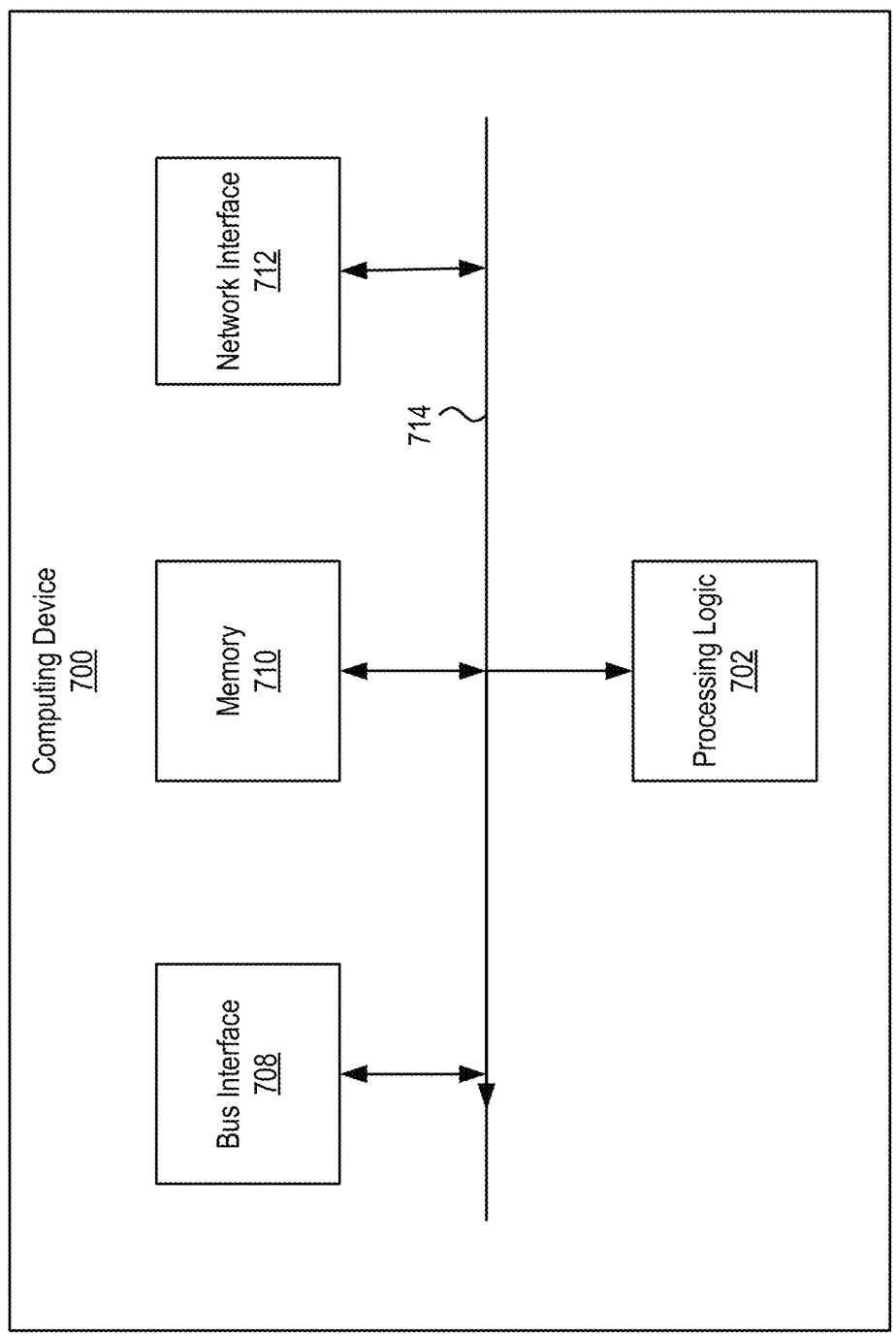
FIG. 7 illustrates an example of a computing device, according to certain aspects of the disclosure.

FIG. 7 illustrates an example of a computing device 700. Functionality and/or several components of the computing device 700 may be used without limitation with other embodiments disclosed elsewhere in this disclosure, without limitations. A computing device 700 may perform computations to facilitate processing of a task. As an illustrative example, computing device 700 can be part of a server in a multi-tenant compute service system. Various hardware and software resources of computing device 700 (e.g., the hardware and software resources associated with provision of an image recognition service) can be allocated to a client upon request.

In one example, the computing device 700 may include processing logic 702, a bus interface module 708, memory 710, and a network interface module 712. These modules may be hardware modules, software modules, or a combination of hardware and software. In certain instances, modules may be interchangeably used with components or engines, without deviating from the scope of the disclosure. The computing device 700 may include additional modules, not illustrated here. In some implementations, the computing device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710. Processing logic 702 may also include hardware circuities for performing artificial neural network computation including, for example, neural network processor 402, etc.

The access to processing logic 702 can be granted to a client to provide the personal assistant service requested by the client. For example, computing device 700 may host a virtual machine, on which an image recognition software application can be executed. The image recognition software application, upon execution, may access processing logic 702 to predict, for example, an object included in an image. As another example, access to processing logic 702 can also be granted as part of bare-metal instance, in which an image recognition software application executing on a client device (e.g., a remote computer, a smart phone, etc.) can directly access processing logic 702 to perform the recognition of an image.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the computing device 700, while in other cases some or all of the memory may be external to the computing device 700. The memory 710 may store an operating system comprising executable instructions that, when executed by the processing logic 702, provides the execution environment for executing instructions providing networking functionality for the computing device 700. The memory 710 may also store, for example, software applications for performing artificial neural network computation. For example, memory 710 may store software routines related to the computations of the equations above. In a case where processing logic 702 is in the form of FPGA, memory 710 may store netlists data representing various logic circuit components of processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the computing device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 900 may include multiple network interface modules, each configured to communicate with a different network. For example, in these implementations, the computing device 700 may include a network interface module for communicating with a wired Ethernet network, a wireless 802.11 network, a cellular network, an Infiniband network, etc. In some embodiments, computing device 700 may receive a set of parameters, such as the aforementioned weight vectors for generation of forget gate factor, input factor, output factor, etc. from a server through network interface module 712.

The various components and modules of the computing device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7 and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An apparatus, comprising:
    an array of processing elements, the array having configurable dimensions; and
    a controller configured to set the dimensions of the array of processing elements based on at least one of: a first number of input data elements to be received by the array, or a second number of output data elements to be output by the array.

2. The apparatus of claim 1, wherein the dimensions comprise an input dimension and an output dimension;
    wherein the input dimension defines the first number of input data elements to be received by the array within a first time, each of the first number of input data elements being part of a different input data element of the first number of input data elements; and
    wherein the output dimension defines the second number of output data elements to be output by the array within a second time, each of the second number of output data elements being part of a different output data element of the second number of output data elements.

3. The apparatus of claim 2, wherein each of the first time and the second time corresponds to one clock period.

4. The apparatus of claim 2, wherein each processing element comprises a plurality of arithmetic units, each of the plurality of arithmetic units being configured to:
    receive an input data element of the first number of input data elements;
    multiply the input data element with a weight to generate a product;
    receive an input partial sum from a first arithmetic unit along the input dimension; and
    add the product to the input partial sum to generate an output partial sum; and wherein the controller is configured to set the input dimension based on controlling the input data elements received by the plurality of arithmetic units of the each processing element.

5. The apparatus of claim 4, further comprising a summation buffer configured to accumulate the output partial sums generated by the plurality of the arithmetic units of a first subset of the array of processing elements along the output dimension to generate the second number of output data elements;
wherein the summation buffer is configurable to either:
for each processing element of the first subset, sum the accumulated output partial sums from the plurality of arithmetic units to generate the second number of output data elements, or
output each of the accumulated output partial sums as the second number of output data elements.

6. The apparatus of claim 5, wherein the controller is configured to, in a first mode:
supply an input data element of the first number of input data elements to each of a second subset of the array of processing elements along the input dimension; and
configure the summation buffer to output each of the accumulated output partial sums as the second number of output data elements.

7. The apparatus of claim 6, wherein the controller is configured to, in a second mode:
supply a plurality of input data elements of the first number of input data elements to each of a second subset of the array of processing elements along the input dimension; and
configure the summation buffer to, for each processing element of the first subset, sum the accumulated output partial sums from the plurality of arithmetic units to generate the second number of output data elements.

8. The apparatus of claim 7, wherein the controller is configured to operate the array and the summation buffer in one of the first mode or the second mode based on a third number of the processing elements in the first subset of the array along the output dimension and a fourth number of the processing elements in the second subset of the array along the input dimension.

9. The apparatus of claim 8, wherein the controller is configured to:
operate the array and the summation buffer in the first mode based on the first number being equal to or smaller than the fourth number; and
operate the array and the summation buffer in the second mode based on the first number exceeding the fourth number.

10. The apparatus of claim 8, wherein the controller is configured to:
operate the array and the summation buffer in the first mode based on the second number exceeding the third number; and
operate the array and the summation buffer in the second mode based on the second number being equal to or smaller than the third number.

11. The apparatus of claim 1, wherein the apparatus is a part of a neural network hardware accelerator configured to implement a neural network; and
wherein the controller is configured to set the dimensions of the array based on a number of processing elements in a neural network layer of the neural network.

12. The apparatus of claim 11, wherein the controller is configured to determine the second number of output data elements based on the number of processing elements in the neural network.

13. The apparatus of claim 11, wherein the controller is configured to switch the dimensions of the array before computations for the neural network layer complete based on a change in at least one of the first number or the second number.

14. The apparatus of claim 11, wherein the neural network is a convolutional neural network;
wherein each input data element corresponds to an input channel of the convolutional neural network; and
wherein each output data element corresponds to an output channel of the convolutional neural network.

15. A method comprising:
determining at least one of: a first number of input data sets to be provided to an array of processing elements having configurable dimensions, or a second number of output data sets to be output by the array of processing elements;
setting the dimensions of the array of processing elements based on at least one of the first number or the second number; and
providing the input data sets to the array of processing elements having the dimensions set to generate the output data sets.

16. The method of claim 15, wherein the dimensions comprise an input dimension and an output dimension;
wherein the input dimension defines the first number of input data sets to be received by the array within a first time, each of the first number of input data sets being part of a different input data set of the first number of input data sets; and
wherein the output dimension defines the second number of output data sets to be output by the array within a second time, each of the second number of output data sets being part of a different output data set of the second number of output data sets.

17. The method of claim 16, wherein each processing element comprises a plurality of arithmetic units;
wherein the method comprises, by the each processing element:
receiving an input data element of the first number of input data sets;
multiplying the input data element with a weight to generate a product;
receiving an input partial sum from a first arithmetic unit along the input dimension; and
adding the product to the input partial sum to generate an output partial sum; and
wherein the method further comprises setting the input dimension based on controlling the input data sets received by the plurality of arithmetic units of the each processing element.

18. The method of claim 17, further comprising: accumulating the output partial sums generated by the plurality of the arithmetic units of a first subset of the array of processing elements along the output dimension to generate the second number of output data sets.

19. The method of claim 18, further comprising:
inputting an input data element of the first number of input data sets to each of a second subset of the array of processing elements along the input dimension; and
outputting each of the accumulated output partial sums as the second number of output data sets.

20. The method of claim 18, further comprising:
inputting a plurality of input data elements of the first number of input data sets to each of a second subset of the array of processing elements along the input dimension; and
for each processing element of the first subset, summing the accumulated output partial sums from the plurality of arithmetic units to generate the second number of output data sets.

* * * * *